(12) United States Patent
Taylor et al.

(10) Patent No.: US 7,548,981 B1
(45) Date of Patent: Jun. 16, 2009

(54) BIOMETRIC AUTHENTICATION OVER WIRELESS WIDE-AREA NETWORKS

(75) Inventors: Paul W. Taylor, Kearney, MO (US); Nathan A. Fink, Lenexa, KS (US); Brian L. Senogles, Kansas City, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 926 days.

(21) Appl. No.: 10/792,468

(22) Filed: Mar. 3, 2004

(51) Int. Cl.
*G06F 15/16* (2006.01)

(52) U.S. Cl. .................. 709/227; 380/248; 713/186; 455/435.1

(58) Field of Classification Search ............. 455/432.1, 455/403, 435.1; 713/202, 201, 186; 370/349, 370/401; 380/248; 709/227
See application file for complete search history.

(56) References Cited

U.S. PATENT DOCUMENTS

| | | | |
|---|---|---|---|
| 2003/0070091 A1* | 4/2003 | Loveland | 713/201 |
| 2003/0110267 A1* | 6/2003 | Prentice et al. | 709/227 |
| 2003/0115490 A1* | 6/2003 | Russo et al. | 713/202 |
| 2004/0029584 A1* | 2/2004 | Le et al. | 455/432.1 |
| 2004/0052238 A1* | 3/2004 | Borella et al. | 370/349 |
| 2005/0041808 A1* | 2/2005 | He | 380/248 |
| 2005/0148314 A1* | 7/2005 | Taglienti et al. | 455/403 |
| 2006/0140196 A1* | 6/2006 | Tanaka et al. | 370/401 |

* cited by examiner

*Primary Examiner*—Jungwon Chang (57) ABSTRACT

A system and method are described for providing biometric authentication to mobile nodes, such as mobile nodes seeking a mobile Internet protocol (mobile IP) connection to a network. The mobile node sends a registration request that includes biometric data. If the biometric data is authenticated, the mobile node is provided with a network address, such as an IP address, to use in network communications.

18 Claims, 5 Drawing Sheets

BIOMETRIC AUTHENTICATION OVER WIRELESS WIDE-AREA NETWORKS

BACKGROUND

As the popularity of mobile telephones and other mobile devices increases, the availability of valuable services offered over these devices also increases. The use of a mobile device for electronic banking and on-line shopping is expected to rise in popularity. While the services offered over mobile devices become more valuable, the need for security gains in importance. For example, if it is possible to use a mobile device to transfer money between bank accounts, it is important to ensure that the person using the mobile device is authorized to do so.

One technique for authorizing users is to store a private key or other token on the mobile device. However, if the device were to fall into the hands of a malicious user, the malicious user would have access to the private key. Another technique for authorizing users is the use of a password. As users are constantly asked for passwords to access different services, however, the temptation to re-use passwords or to write down passwords in an easily-accessible location can be great, despite the attendant compromises to security.

Mobile devices often communicate with a network using the mobile IP protocol, described in, for example, C. Perkins, ed., "IP Mobility Support for IPv4," Internet Request for Comments (RFC) 3220 (January 2002).

In the mobile IP protocol, a mobile device is associated with a network node called the home agent. The home agent assigns an IP address to the mobile device, so that data packets addressed to the mobile device are routed to the home agent. The mobile device may be at a location far from the home agent, however, so that the home agent cannot send the data packets directly to the mobile device. To allow the mobile device to communicate with the network even when it is distant from the home agent, the mobile device registers with another network node known as a foreign agent. Different foreign agents may be provided to cover different geographic locations, and the mobile device may select different foreign agents depending on its location. The foreign agent sends a registration message to the home agent, notifying the home agent that the foreign agent is in communication with the mobile device.

Communications are sent to the mobile device as follows. The home agent receives data addressed to the mobile device. The home agent sends that data to the foreign agent with which the mobile device has registered, and the foreign agent in turn sends the data to the mobile device. The foreign agent communicates with the mobile device via, for example, a point-to-point protocol (PPP) connection.

An authentication system that provides secure access to a mobile device would help to ensure that only authorized users can access valuable on-line services over a mobile device.

SUMMARY

In a method of authenticating a mobile node, the mobile node sends a registration message that includes biometric data. If the biometric data is associated with an authorized network user, the mobile node is provided with a network address. The network address is associated with a home agent, so that network communications received by the home agent that are directed to the assigned network address are forwarded by the home agent to the mobile node. The home agent may forward the network communications to the mobile node through a foreign agent.

DETAILED DESCRIPTION

I. Overview of an Exemplary Embodiment

In one embodiment of a biometric authentication system, a mobile telephone or other mobile device seeks to communicate with a network, such as the Internet or another IP (Internet protocol) network, using a mobile IP protocol. In this embodiment, the mobile device seeks to communicate with the network through agent nodes such as a foreign agent and a home agent.

The system requires biometric authentication of a user before the mobile device is permitted to communicate with the network. To perform this authentication, the mobile device captures biometric data from the user and places the data in an encoded form. The mobile device then sends to the foreign agent a registration message that includes the encoded biometric data. The foreign agent in turn sends a registration message including the encoded biometric data to the home agent.

The home agent authenticates the user by sending the encoded biometric data to an authenticator. The authenticator has access to stored biometric data that corresponds to various users. The authenticator compares the encoded biometric data to the stored biometric data to determine whether the user is an authorized user. If the user is an authorized user, the authenticator directs the home agent to assign an IP address to the mobile device.

To assign an IP address to the mobile device, the home agent sends a registration reply to the foreign agent, which in turn sends a registration reply to the mobile device. These registration replies include the assigned IP address. The assigned IP address is selected from a block of IP addresses that are associated with the home agent. These addresses are associated with the home agent in the sense that a datagram sent to one of these addresses will be routed to the home agent.

After the mobile device receives the registration reply with the assigned IP address, it can communicate with the network using the mobile IP protocol. In one example, the mobile device sends an IP datagram to a destination node on the network. The datagram may include an HTTP request for a Web page. The IP datagram includes a "destination IP address" field that includes the IP address of the destination node. The IP datagram also includes a "source IP address" field that includes the assigned IP address of the mobile device. In response to the datagram sent by the mobile device, the destination node on the network sends response data to the assigned IP address of the mobile device. The response data is routed to the home agent, and the home agent recognizes the assigned IP address as being assigned to the mobile device. The home agent then sends the response data to the mobile device via the foreign agent.

If the authenticator does not determine that the user is an authorized user, the home agent does not assign an IP address to the mobile device. As a result, the mobile device will be unable to communicate with the network. In particular, the mobile device will be unable to include an assigned IP address from the home agent in any IP datagram that it sends. In consequence, any destination node that receives such a datagram will be unable to send response data to the mobile device through the home agent.

II. Biometric Authentication

A. Measurement of Biometric Data

The mobile device may measure biometric data in a variety of ways. In different embodiments, the mobile device can collect different biometric data, and even different embodiments that measure the same biometric data may measure such data with different types of sensors.

In one embodiment, the biometric data measured is voice data. In this embodiment, the mobile device converts measurements of the user's voice into electronic voice data. Where the mobile device is a mobile telephone, the mobile device may use the microphone of the mobile telephone to create electronic voice data. The mobile device then processes the electronic voice data to create encoded voice data.

One method the mobile device may use to create encoded voice data is to process the electronic voice data into voice print data and then to input the voice print data into a hash function. In this case, the resulting hash value is used as the encoded biometric data.

In another embodiment, the biometric data measured is retinal scan data. The collection of retinal scan data may be performed by optical measurements using technology from Retinal Technologies, LLC of Winchester, Mass., as described in, for example, U.S. Pat. Nos. 5,861,939, 5,861,938, 5,784,148, 5,949,520, and 5,673,097.

Other biometric parameters may likewise be measured in these or other embodiments of the mobile device. For example, the mobile device may read a user's fingerprints or hand geometry, or it may scan the user's iris.

The sensors used by a mobile device may be built in to the mobile device, or the sensors may be incorporated in a peripheral device that communicates via a wire or wirelessly with the mobile device. In an embodiment in which the computational power required to read or encode biometric data exceeds that available to the mobile device alone, the peripheral device may include its own processor that operates to read or encode the biometric data.

Figure 1:
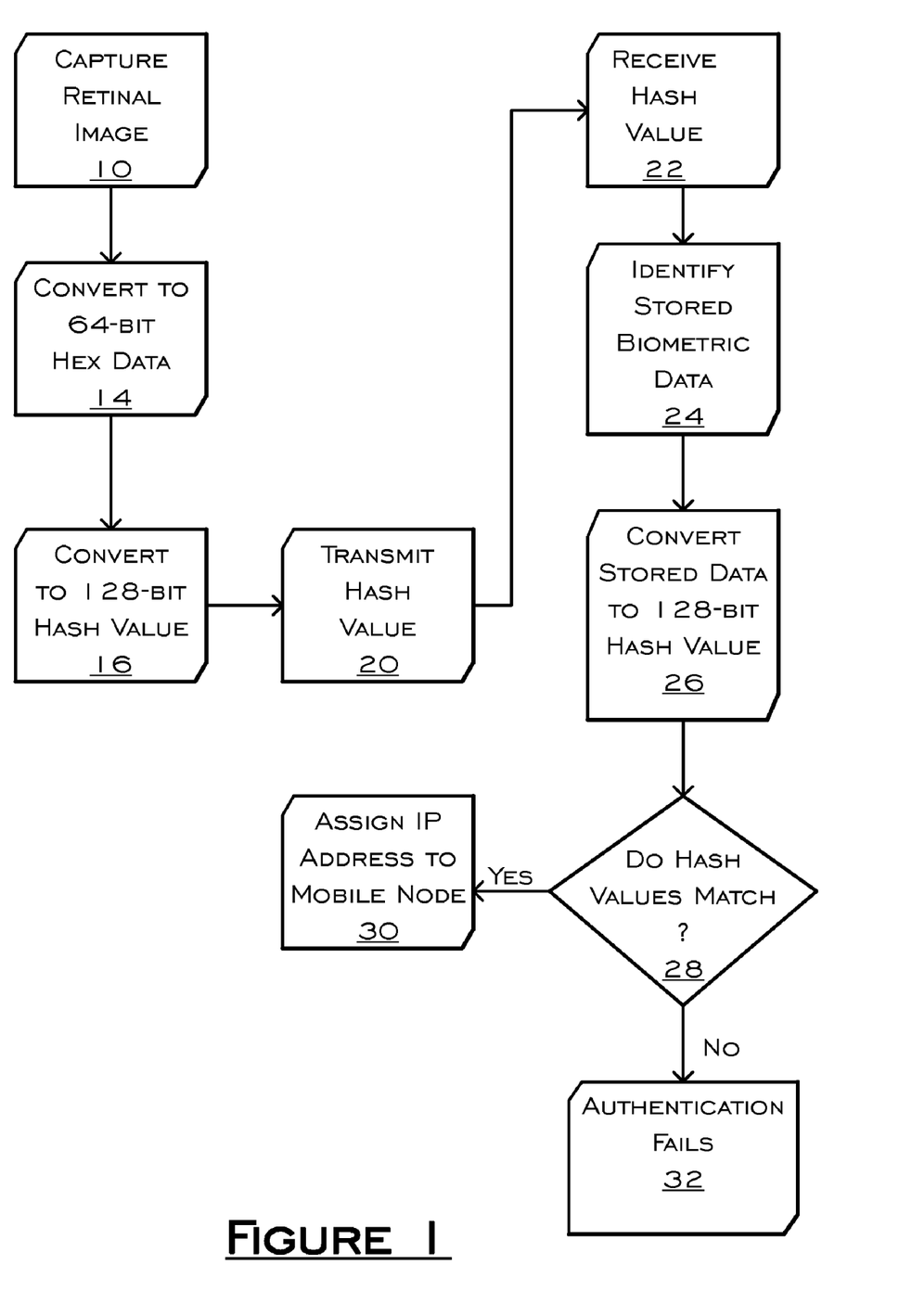
FIG. 1 is a schematic flow diagram illustrating a method of biometric authentication.

An example of the processing of biometric data is illustrated in FIG. 1. In step 10, the mobile device—or a scanner in communication with the mobile device—captures an image of a user's retina and stores it as binary data. At step 14, the binary data is converted to 64-bit hexadecimal format. At step 16, the 64-bit hexadecimal value is passed through a hash algorithm that converts the 64-bit hexadecimal value to a 128-bit hash value to create encoded biometric data. The hash value (encoded biometric data) is conveyed to the authenticator at step 20 together with a user identifier, such as a SIP (session initiation protocol) address or a mobile node network access identifier (MN-NAI).

B. User Authentication

The encoded biometric data sent by the mobile device may be authenticated at a variety of locations. For example, in one embodiment, the authentication is performed by an authenticator at the home agent. In another embodiment, the authenticator is an authentication, authorization, and accounting (AAA) server separate from the home agent.

The authenticator has access to a database of user authentication records that may be indexed by a user identifier. Each of the user authentication records stores biometric data of a respective user. The biometric data may be stored as a 64-bit hexadecimal representation of the user's retinal image. Each record may also include information specifying which home agents and foreign agents the user is permitted to access.

The authentication process is illustrated in FIG. 1. The authenticator receives the encoded biometric data and the user identifier at step 22. The authenticator identifies an authentication record that corresponds to the user identifier and, at step 24, it reads stored biometric data from the authentication record. In this example, the stored biometric data represents the user's retinal image. In step 26, a hash algorithm converts the 64-bit image data stored in the authentication record into 128-bit hash value. The hash algorithm of step 26 may be the same as the hash algorithm used by the mobile device in step 16. In step 28, the authenticator compares the hash value sent from the mobile device with the hash value derived from the authentication record. If the values match, the authenticator assigns an IP address to the mobile device at step 30. If the values do not match, authentication fails, and the mobile device is not assigned an IP address.

III. Network Communications

Biometric authentication of a mobile node may be conducted using a variety of methods. In one such method, a mobile node establishes wireless communications with a PDSN (packet data serving node) known as a mobility agent. The mobile node communicates with the mobility agent using the point-to-point protocol (PPP) over a code-division multiple access (CDMA) channel. With PPP communications established, the mobile node and mobility agent establish a mobile IP session with a home agent, with the mobility agent acting as the foreign agent. An IP address is assigned to the mobile node for the mobile IP session only if encoded biometric data sent by the mobile node is accepted by a AAA server. This section describes this embodiment in further detail.

Figure 2:
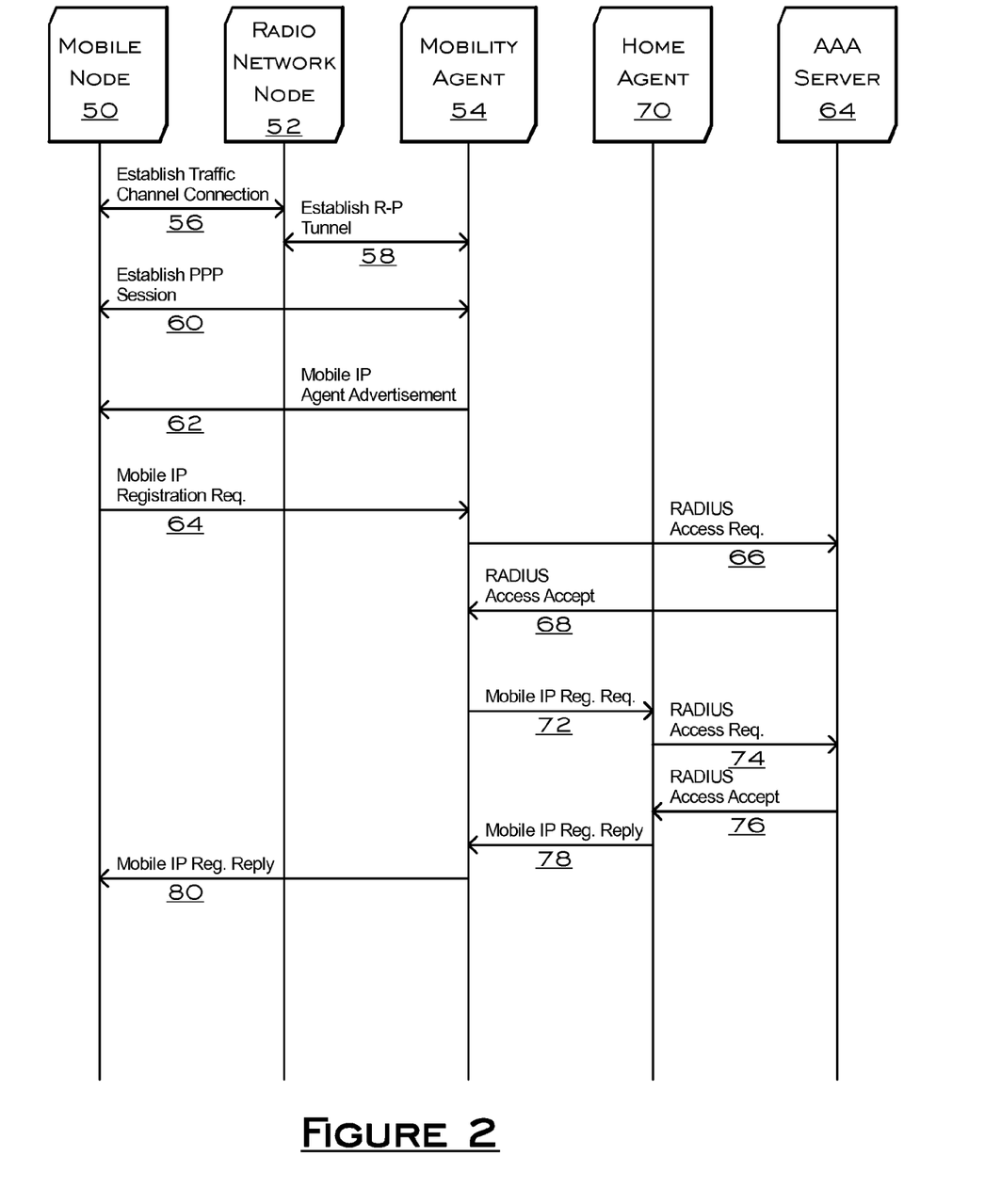
FIG. 2 illustrates the exchange of data in a biometric authentication system.

As illustrated in FIG. 2, a mobile node 50, such as an IP-enabled mobile telephone, establishes communications with the mobility agent 54 through a radio network node 52. In step 56, the mobile node and radio network node establish a traffic channel connection over a wireless CDMA channel. The radio network node 52 establishes an R-P tunnel (Radio Network—Packet Data Serving Node tunnel) with the mobility agent in step 58.

After CDMA communications are set up between the mobile node and the mobility agent, the mobile node and mobility agent establish a PPP session in step 60 by exchanging LCP (link control protocol) and IPCP (Internet protocol control protocol) messages.

The mobility agent, mobile node, and home agent establish a mobile IP session as follows. The mobility agent, acting as a foreign agent, sends an agent advertisement message in step 62 to the mobile node over the PPP session. The mobile node responds to the agent advertisement with a mobile IP registration request in step 64.

The mobile IP registration request contains authentication information for the user of the mobile node. In this embodiment, the authentication information includes encoded biometric data collected from the user, as described in section II, above, and the MN-NAI of the mobile node.

After it receives the registration request from the mobile node, the mobility agent determines whether the mobile node is permitted to use the mobility agent as a foreign agent. To make this determination, the mobility agent sends a RADIUS (remote authentication dial-in user service) access request to a AAA server 64 in step 66. The RADIUS access request includes the MN-NAI of the mobile node. If the mobile node is permitted to use the mobility agent as a foreign agent, the AAA server replies with a RADIUS access accept message in step 68.

Once the mobility agent has confirmed that the mobile node is permitted to use it as a foreign agent, the mobility agent sends a mobile IP registration request associated with the mobile node to the home agent 70 in step 72. The mobile IP registration request includes the encoded biometric data sent by the mobile node. To determine whether the user is authorized to communicate through the home agent, the home agent sends a RADIUS access request including the encoded biometric data to a AAA server in step 74. The AAA server then determines whether the encoded biometric data is associated with an authorized user. For example, if the RADIUS request includes a user identifier and encoded biometric data, the AAA server first determines whether the user identifier identifies an authorized user. If so, the AAA server locates stored biometric data associated with the user identifier and compares the stored biometric data with the encoded biometric data. If the AAA server determines that the encoded biometric data matches the stored biometric data, it assigns an IP address to the mobile node and sends that IP address in a RADIUS access accept message to the home agent in step 76.

The home agent sends a registration reply to the mobile node (through the mobility agent) that conveys the assigned IP address to the mobile node. In step 78, the home agent sends the mobile IP registration reply message, including the assigned IP address, to the mobility agent. In step 80, the mobility agent sends the IP address to the mobile node in the mobile IP registration reply. After the mobile node has received its IP address from the home agent, it can carry out network communications via the mobile IP protocol.

In carrying out network communications, the mobile node may requests data to be sent to the IP address assigned to it. The requested data is routed to the home agent, which in turn sends it to the mobility agent. The home agent may use an IP-in-IP tunnel to send requested data to the mobility agent. That is, when the home agent receives an IP datagram addressed to the assigned IP address, it packages that IP datagram as the data field of a second IP datagram, and it sends the second IP datagram to the mobility agent. The mobility agent then conveys the data to the mobile node over the PPP connection.

IV. Biometric Authentication System

A system for use in practicing the biometric authentication method described above may include a mobile node and an authenticator. Embodiments of one such mobile node and authenticator are described in sections IV.A and IV.B., below. The following section IV.C illustrates one arrangement of the mobile node, authenticator, and other network components.

A. Mobile Node

Figure 3:
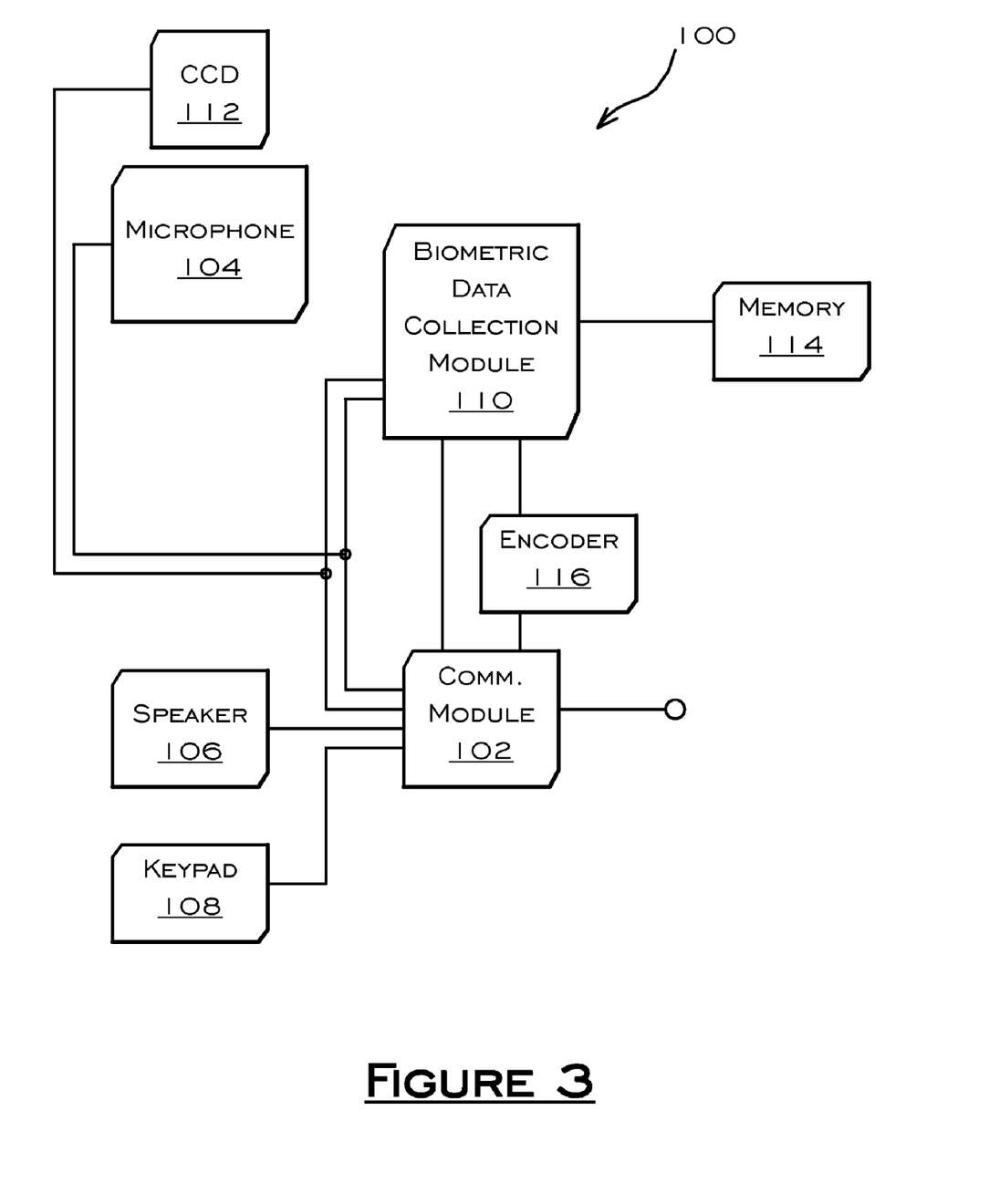
FIG. 3 is a block diagram illustrating the functional architecture of a mobile node that may be used in practicing a biometric authentication method.

A mobile node 100, as illustrated in FIG. 3, may be an IP-enabled CDMA mobile telephone. The mobile node includes a communications module 102 for managing wireless communications with a service provider, including voice and data communications. The mobile node includes a microphone 104, a speaker 106, and a keypad 108 for carrying out conventional mobile telephone voice communications. The mobile node further includes a biometric data collection module 110 that manages the collection of biometric data.

In the case in which the biometric data collected from the user is voice data, the mobile node may collect the voice data from the same microphone 104 used for telephone communications or from a different microphone. In the case in which the biometric data is retinal or iris image data, the mobile node may include a charge coupled device (CCD) 112 or other imaging device. Likewise, where the biometric data collected from the user is fingerprint data, the fingerprint data may be collected by a CCD 112. Where the mobile device is a mobile telephone provided with a camera feature, the mobile device may use the same CCD 112 in operating the camera feature and in collecting biometric data. Biometric data sensors other than (or in addition to) the microphone 104 and the CCD 112 may be employed, such as a stylus pad (not illustrated) for collecting signature data.

The mobile device is provided with a biometric data memory 114 for short- or long-term storage of biometric data.

After the communications module receives a request for biometric data, such as in an agent advertisement message, the communications module requests biometric data from the biometric data collection module. The biometric data collection module 110 may retrieve biometric data from a memory 114. Alternatively (for example, if the data in the memory has expired, or in an embodiment that does not make use of a biometric data memory, the biometric data collection module collects biometric data through one or more of the biometric data sensors. An encoder 116 encodes the collected biometric data, for example by encrypting the data and/or creating a hash value from the data. The communications module 102 may then send the encoded biometric data in response to the request for biometric data. In addition to the encoded biometric data, the communications module may also send user identifier data kept in the memory 114. The user identifier data may include, for example, a MN-NAI and/or a SIP address.

B. Authenticator

Figure 4:
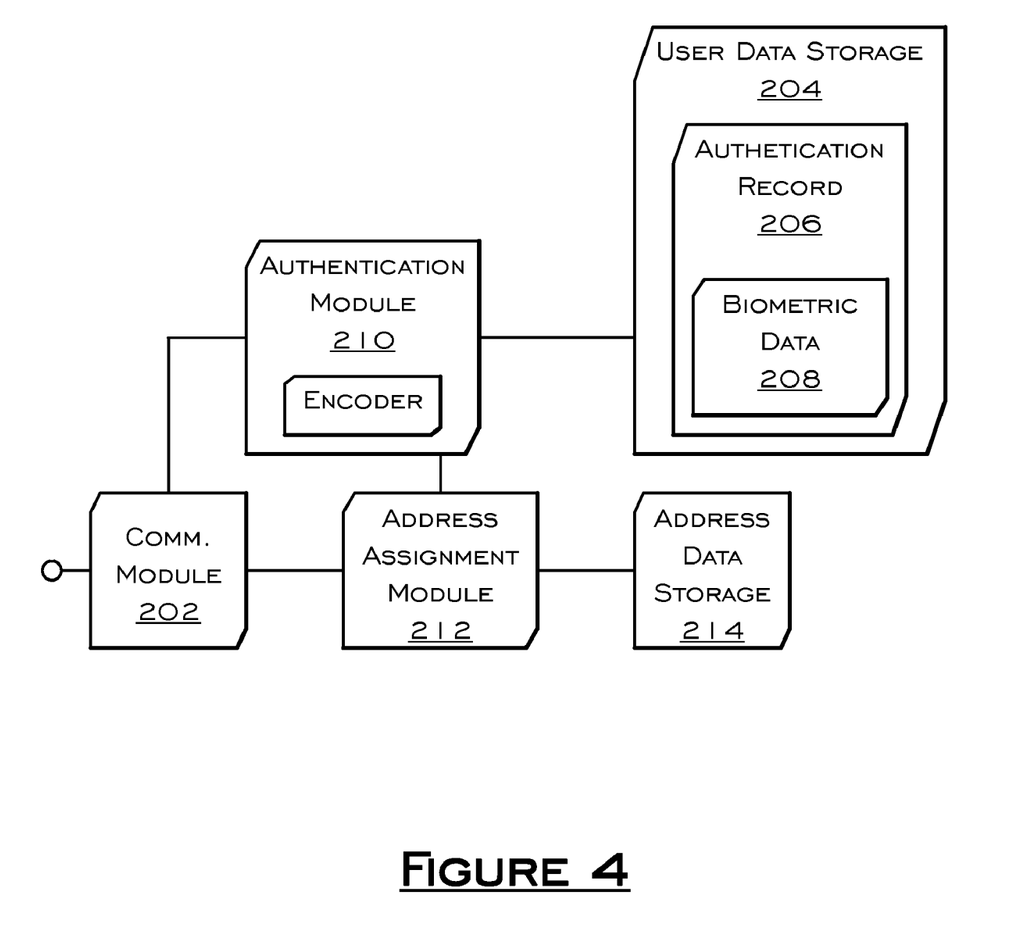
FIG. 4 is a block diagram illustrating the functional architecture of an authenticator that may be used in practicing a biometric authentication method.

An authenticator 200, as illustrated in FIG. 4, includes a communications module 202 that operates to receive encoded biometric data. The encoded biometric data may have been received in, for example, a RADIUS access request sent by a mobility agent or a home agent. The RADIUS access request may also include a user identifier, such as a SIP address or an MN-NAI identifier, identifying a mobile node seeking to gain access to the mobility agent or home agent. The authenticator is provided with user data storage 204 that stores one or more authentication records 206. An authentication record includes biometric data 208 associated with users of mobile nodes.

The authenticator 200 is provided with an authentication module 210. In response to receiving a RADIUS access request that includes a user identifier and encoded biometric data, the authentication module locates an authentication record that is associated with the user identifier. The authentication module then compares the biometric data from the authentication record with the encoded biometric data in the RADIUS access request to determine whether there is a match. To determine whether there is a match, the authentication module may employ an encoder 216. For example, the encoder 116 at the mobile node and the encoder 216 at the authenticator may both encode data in the same way, using a hash function, for instance. In this way, the authentication module compares the encoded biometric data as it was sent by the mobile node and as it was created by the encoder 216, so that unencoded biometric data need not be sent over the network.

The authenticator 200 is further provided with an address assignment module 212. If the biometric data in the access request matches the biometric data in the user data storage, the authentication module alerts the address assignment module to assign an IP address to the mobile node. The IP address to be assigned to the mobile node may be selected from a block of IP addresses stored in an address data storage 214. The address data storage may, for example, associate a multitude of IP addresses with each home agent.

C. Authentication Network

Figure 5:
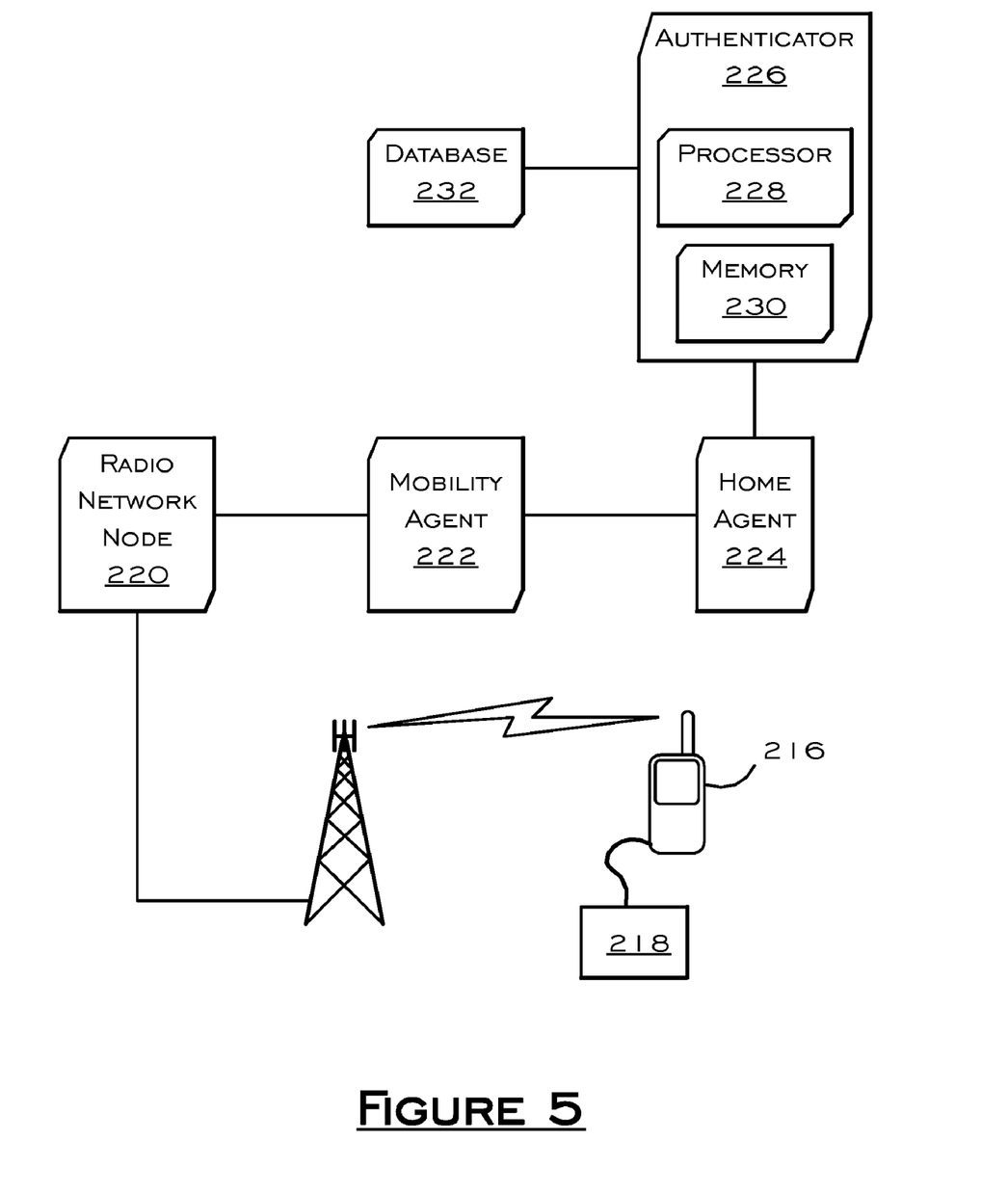
FIG. 5 is a schematic block diagram illustrating one implementation of a biometric authentication system.

As illustrated in FIG. 5, a network used in biometric authentication includes a mobile device 216 and an authenticator 226. The mobile node 216 is provided with a peripheral device 218 to aid in the collection of biometric data. The mobile node communicates wirelessly with a radio network node 220, allowing it to set up a PPP connection with a mobility agent 222. The mobility agent and a home agent 224 communicate over an IP network. In turn, the home agent 224 communicates with the authenticator 226.

In the embodiment of FIG. 5, the authenticator is implemented as a general-purpose server computer provided with a processor 228 and a memory 230. The memory 228 stores instructions executable by the processor to operate the authenticator as described above. The authenticator has access to a database 232, which may be implemented on the same server computer as the authenticator or on a separate computer. The database 232 can store user identifiers, biometric data, and/or other authentication information used to determine whether a user of the mobile device 216 is authorized.

V. Additional Embodiments

In the examples given above, the authenticator has been implemented in a AAA server. In alternative embodiments the authenticator may be implemented in the home agent or the foreign agent. In one embodiment, the authenticator is implemented as a stand-alone service that could be accessed by home agents and/or AAA servers that are associated with different service providers.

The mobile node may authenticate itself in one of several different ways. For example, the mobile node may authenticate itself to the mobility agent using a non-biometric MN-FA (mobile node-foreign agent) authorization extension, such as a password, and then authenticate itself to the home agent using a MN-HA (mobile node-home agent) extension that includes encoded biometric data. Alternatively, access to the foreign agent may be conducted using biometric data, and access to the home agent may or may not depend on the biometric data.

The mobile node may operate to collect biometric data from a user each time the user attempts to access a network, for example, in response to an agent advertisement received from a mobility agent. In another embodiment, the mobile node may store the user's biometric data for use in repeated connections to the network. In this case, the biometric data may be cleared from memory on a periodic basis, requiring the user to provide biometric data for subsequent attempts to access the network.

The methods described above may be performed by hardware or by software. For example, they may be performed by a computer processor according to the direction of executable software instructions stored in a computer memory.

Although the exemplary embodiments described above illustrate the use of a CDMA wireless network, the biometric authentication system described could be implemented in other networks, such as other wireless wide area networks (WWANs), wireless local area networks (WLANs), or wired networks.

The exemplary embodiments described above are provided as illustrations of particular uses of the invention and should not be taken to limit the scope of the invention, as defined by the claims that follow.

The invention claimed is:

1. A method of authenticating a mobile node, comprising:
receiving at a mobility agent a first registration request message associated with a mobile node, wherein the registration message includes biometric data;
sending a second registration request from the mobility agent to a home agent, the second registration request including the biometric data;
after receiving the second registration request at the home agent, determining whether the biometric data is associated with an authorized user;
only after determining that the biometric data is associated with an authorized user, assigning a network address to the mobile node; and
sending the network address to the mobile node in a registration reply message.

2. The method of claim 1, wherein at least the second registration message is a mobile IP registration request message and at least the second registration reply is a mobile IP registration reply message.

3. The method of claim 2, wherein receiving the first registration message includes receiving the biometric data in an MN-FA extension of the registration message.

4. The method of claim 2, wherein receiving the first registration message includes receiving the biometric data in an MN-HA extension of the registration message.

5. The method of claim 1, wherein the second registration message includes a user identifier, and wherein determining whether the biometric data is associated with an authorized user comprises:
identifying stored biometric data associated with the user identifier; and
comparing the stored biometric data with the biometric data included in the second registration message.

6. The method of claim 5, wherein the biometric data included in the second registration message is first encoded data, and wherein comparing the stored biometric data with the biometric data included in the registration message comprises encoding the stored biometric data to create second encoded data and comparing the first encoded data with the second encoded data.

7. The method of claim 1, wherein determining whether the biometric data is associated with an authorized user comprises sending an access request message to an authenticator, wherein the access request message includes the biometric data.

8. The method of claim 1, wherein the network address is an IP address.

9. A method of authenticating a mobile node, comprising:
sending an agent advertisement from an agent node, wherein the agent advertisement includes a request for biometric data;
receiving, at the agent node, a registration request associated with the mobile node, wherein the registration request includes biometric data;
sending, to an authenticator node, an access request including the biometric data;
receiving, from the authenticator node, an access acceptance including a network address; and sending, to the mobile node, a registration reply assigning the network address to the mobile node.

10. The method of claim 9, wherein the agent node is a mobile IP home agent.

11. The method of claim 9, wherein the agent node is a mobile IP foreign agent.

12. The method of claim 9, wherein the network address is an IP address.

13. A method of authenticating a mobile node, comprising:
sending an agent advertisement from a mobility agent, wherein the agent advertisement includes a request for biometric data;
receiving a first registration message associated with a mobile node, wherein the first registration message includes biometric data;
sending a second registration request from the mobility agent to a home agent, the second registration message including the biometric data;
after receiving the second registration request at the home agent, determining whether the biometric data is associated with an authorized user;
in response to a determination that the biometric data is associated with an authorized user, assigning a network address to the mobile node;
after assigning the network address to the mobile node, receiving at the home agent network data sent to the assigned network address; and
forwarding the network data from the home agent to the mobile node.

14. The method of claim 13, wherein the receiving of network data is performed at a home agent.

15. The method of claim 14, wherein forwarding the network data to the mobile node includes sending the network data to a foreign agent.

16. A method of authenticating the user of a mobile telephone comprising:
receiving, at the mobile telephone, an agent advertisement from an agent node, wherein the agent advertisement includes a request for biometric data;
collecting biometric data of a user in response to receiving the agent advertisement;
sending the collected biometric data to the agent node in a registration request message;
after sending the collected biometric data, receiving a registration reply message including a home address assigned to the mobile telephone; and
receiving, from the agent node, data addressed to the home address.

17. A method according to claim 16, wherein collecting biometric data includes obtaining biometric data from the user if biometric data stored at the mobile telephone has expired, and obtaining biometric data from a memory if biometric data stored at the mobile telephone has not expired.

18. A method according to claim 16, wherein collecting biometric data includes operating a biometric data sensor to obtain biometric data from the user in response to receiving the agent advertisement.

* * * * *